United States Patent
Van Nee et al.

(10) Patent No.: US 8,432,785 B2
(45) Date of Patent: Apr. 30, 2013

(54) FLEXIBLE SDMA AND INTERFERENCE SUPPRESSION

(75) Inventors: Didier Johannes Richard Van Nee, De Meem (NL); Sameer Vermani, San Diego, CA (US); Vincent Knowles Jones, IV, Redwood City, CA (US); Hemanth Sampath, San Deigo, CA (US); Albert Van Zelst, Woerden (NL)

(73) Assignee: QUALCOMM Incorporated, San Diego, CA (US)

( * ) Notice: Subject to any disclaimer, the term of this patent is extended or adjusted under 35 U.S.C. 154(b) by 347 days.

(21) Appl. No.: 12/860,102

(22) Filed: Aug. 20, 2010

(65) Prior Publication Data

US 2011/0051636 A1 Mar. 3, 2011

Related U.S. Application Data

(60) Provisional application No. 61/239,379, filed on Sep. 2, 2009.

(51) Int. Cl.
*H04L 5/00* (2006.01)
*H04B 1/10* (2006.01)
*H04B 15/00* (2006.01)
*H04W 4/00* (2009.01)
*H04J 3/16* (2006.01)

(52) U.S. Cl.
USPC .......... 370/204; 370/286; 370/332; 370/437; 375/144; 455/63.1

(58) Field of Classification Search .......... 370/203–210, 370/286–292, 310–350, 431–463; 375/130–150; 455/63.1, 114.2, 278.1, 296
See application file for complete search history.

(56) References Cited

U.S. PATENT DOCUMENTS

| | | | |
|---|---|---|---|
| 5,471,647 A | 11/1995 | Gerlach et al. | |
| 7,583,723 B2 * | 9/2009 | Heikkilä | 375/148 |
| 7,801,248 B2 * | 9/2010 | Challa et al. | 375/316 |
| 2008/0063120 A1 | 3/2008 | Aoki et al. | |
| 2010/0309834 A1 * | 12/2010 | Fischer et al. | 370/312 |
| 2011/0317775 A1 * | 12/2011 | Gardner et al. | 375/259 |
| 2012/0027139 A1 * | 2/2012 | Khayrallah et al. | 375/347 |

FOREIGN PATENT DOCUMENTS

WO  WO2009027931 A2  3/2009

OTHER PUBLICATIONS

International Search Report and Written Opinion -PCT/US2010/047732, International Search Authority—European Patent Office—Jan. 26, 2011.
Paul T K, et al., "Wireless LAN Comes of Age: Understanding the IEEE 802.11n Amendment" IEEE Circuits and Systems Magazine, IEEE Service Center, New York, NY, US, vol. 8, No. 1, Jan. 1, 2008, pp. 28-54, XP011205239 ISSN: 1531-636X.

(Continued)

*Primary Examiner* — Tri H Phan
(74) *Attorney, Agent, or Firm* — Kenyon S. Jenckes

(57) ABSTRACT

Certain aspects of the present disclosure provide a method for performing interference suppression in spatial division multiple access (SDMA) systems. When the number of receive antennas of a receiver is equal or larger than the number of spatial streams intended for the receiver, the receiver may perform interference suppression on the signals received on all of its antennas. In addition, certain aspects of the present disclosure present a flexible SDMA technique in which a plurality of channel estimates that may be received from an explicit feedback or estimated implicitly, are combined. The combined channel estimate may be used in calculating the SDMA weights.

26 Claims, 9 Drawing Sheets

OTHER PUBLICATIONS

Son, Jungbo, et al., "Design and Verification of High Throughput Transceiver for Next Generation Wireless LAN" 2006 IEEE 64th Vehicular Technology Conference : VTC 2006-Fall ; Sep. 25-28, 2006, Montreal, Quebec, Canada, Piscataway, NJ : IEEE Operations Center, Sep. 1, 2006, pp. 1-5, XP031051308 DOI: DOI:10.1109/VTCF.2006.374 ISBN: 978-1-4244-0062-1.

* cited by examiner

US 8,432,785 B2

FLEXIBLE SDMA AND INTERFERENCE SUPPRESSION

CLAIM OF PRIORITY UNDER 35 U.S.C. §119

The present application for patent claims benefit of U.S. Provisional Patent Application Ser. No. 61/239,379, entitled, "Multi-User Detection in SDMA," filed Sep. 2, 2009, and assigned to the assignee hereof and hereby expressly incorporated by reference herein.

TECHNICAL FIELD

Certain aspects of the present disclosure generally relate to wireless communications and, more particularly, to flexible spatial-division multiple access (SDMA) and interference suppression.

BACKGROUND

In order to address the issue of increasing bandwidth requirements that are demanded for wireless communications systems, different schemes are being developed to allow multiple user terminals to communicate with a single access point by sharing the channel resources while achieving high data throughputs. Multiple Input or Multiple Output (MIMO) technology represents one such approach that has recently emerged as a popular technique for the next generation communication systems. MIMO technology has been adopted in several emerging wireless communications standards such as the Institute of Electrical and Electronics Engineers (IEEE) 802.11 standard. IEEE 802.11 denotes a set of Wireless Local Area Network (WLAN) air interface standards developed by the IEEE 802.11 committee for short-range communications, such as tens of meters to a few hundred meters.

A MIMO wireless system employs a number ($N_T$) of transmit antennas and a number ($N_R$) of receive antennas for data transmission. A MIMO channel formed by the $N_T$ transmit and $N_R$ receive antennas may be decomposed into $N_S$ spatial streams, where, for all practical purposes, $N_S <= \min\{N_T, N_R\}$. The $N_S$ spatial streams may be used to transmit $N_S$ independent data streams to achieve greater overall throughput.

In wireless networks with a single access point and multiple stations, concurrent transmissions may occur on multiple channels toward different stations, both in the uplink and downlink directions. Many challenges are presented in such systems, such as the ability to communicate with legacy devices in addition to non-legacy devices, efficient use of resources, and interference.

SUMMARY

Certain aspects of the present disclosure provide a method for wireless communications. The method generally includes receiving a signal via at least one antenna of a receiver, the signal comprising a plurality of spatial streams, wherein a number of spatial streams from the plurality of spatial streams intended for the receiver is less than or equal to a number of the antennas, and performing, based on one or more long training fields (LTFs) of the signal received by each of the antennas, interference suppression to eliminate interference caused by one or more of the spatial streams intended for other receivers, wherein the LTFs are utilized to estimate channels of the spatial streams intended for the other receivers.

Certain aspects of the present disclosure provide an apparatus for wireless communications. The apparatus generally includes a receiver configured to receive a signal via at least one antenna of the apparatus, the signal comprising a plurality of spatial streams, wherein a number of spatial streams from the plurality of spatial streams intended for the apparatus is less than or equal to a number of the antennas, and a circuit configured to perform, based on one or more long training fields (LTFs) of the signal received by each of the antennas, interference suppression to eliminate interference caused by one or more of the spatial streams intended for other apparatuses, wherein the LTFs are utilized to estimate channels of the spatial streams intended for the other apparatuses.

Certain aspects of the present disclosure provide an apparatus for wireless communications. The apparatus generally includes means for receiving a signal via at least one antenna of the apparatus, the signal comprising a plurality of spatial streams, wherein a number of spatial streams from the plurality of spatial streams intended for the apparatus is less than or equal to a number of the antennas, and means for performing, based on one or more long training fields (LTFs) of the signal received by each of the antennas, interference suppression to eliminate interference caused by one or more of the spatial streams intended for other apparatuses, wherein the LTFs are utilized to estimate channels of the spatial streams intended for the other apparatuses.

Certain aspects of the present disclosure provide a computer-program product for wireless communications. The computer-program product includes a computer-readable medium comprising instructions executable to receive a signal via at least one antenna of a receiver, the signal comprising a plurality of spatial streams, wherein a number of spatial streams from the plurality of spatial streams intended for the receiver is less than or equal to a number of the antennas, and perform, based on one or more long training fields (LTFs) of the signal received by each of the antennas, interference suppression to eliminate interference caused by one or more of the spatial streams intended for other receivers, wherein the LTFs are utilized to estimate channels of the spatial streams intended for the other receivers.

Certain aspects of the present disclosure provide a wireless node. The wireless node generally includes at least one antenna, a receiver configured to receive a signal via the at least one antenna of the wireless node, the signal comprising a plurality of spatial streams, wherein a number of spatial streams from the plurality of spatial streams intended for the wireless node is less than or equal to a number of the antennas, and a circuit configured to perform, based on one or more long training fields (LTFs) of the signal received by each of the antennas, interference suppression to eliminate interference caused by one or more of the spatial streams intended for other wireless nodes, wherein the LTFs are utilized to estimate channels of the spatial streams intended for the other wireless nodes.

Certain aspects of the present disclosure provide a method for wireless communications. The method generally includes estimating a plurality of wireless channels between a transmitter and at least two receivers, wherein a channel estimation of at least one of the receivers is obtained differently compared to other receivers, and the channel estimations are obtained either through explicit feedback from a receiver to the transmitter comprising a channel state information (CSI) or a compressed representation of the CSI, or implicit estimation of a channel from the transmitter to the receiver using a channel from the receiver to the transmitter, combining the channel estimations to obtain a combined channel estimation, calculating spatial division multiple access (SDMA) weights based on the combined channel estimation, and sending a plurality of signals to the receivers using the calculated SDMA weights.

Certain aspects of the present disclosure provide an apparatus for wireless communications. The apparatus generally includes an estimator configured to estimate a plurality of wireless channels between the apparatus and at least two other apparatuses, wherein a channel estimation of at least one of the other apparatuses is obtained differently compared to other apparatuses, and the channel estimations are obtained either through explicit feedback from one of the other apparatuses to the apparatus comprising a channel state information (CSI) or a compressed representation of the CSI, or implicit estimation of a channel from the apparatus to the other apparatus using a channel from the other apparatus to the apparatus, a combiner configured to combine the channel estimations to obtain a combined channel estimation, a circuit configured to calculate spatial division multiple access (SDMA) weights based on the combined channel estimation, and a transmitter configured to send a plurality of signals to the other apparatuses using the calculated SDMA weights.

Certain aspects of the present disclosure provide an apparatus for wireless communications. The apparatus generally includes means for estimating a plurality of wireless channels between the apparatus and at least two other apparatuses, wherein a channel estimation of at least one of the other apparatuses is obtained differently compared to other apparatuses, and the channel estimations are obtained either through explicit feedback from one of the other apparatuses to the apparatus comprising a channel state information (CSI) or a compressed representation of the CSI, or implicit estimation of a channel from the apparatus to the other apparatus using a channel from the other apparatus to the apparatus, means for combining the channel estimations to obtain a combined channel estimation, means for calculating spatial division multiple access (SDMA) weights based on the combined channel estimation, and means for transmitting a plurality of signals to the other apparatuses using the calculated SDMA weights.

Certain aspects of the present disclosure provide a computer-program product for wireless communications. The computer-program product includes a computer-readable medium comprising instructions executable to estimate a plurality of wireless channels between a transmitter and at least two receivers, wherein a channel estimation of at least one of the receivers is obtained differently compared to other receivers, and the channel estimations are obtained either through explicit feedback from a receiver to the transmitter comprising a channel state information (CSI) or a compressed representation of the CSI, or implicit estimation of a channel from the transmitter to the receiver using a channel from the receiver to the transmitter, combine the channel estimations to obtain a combined channel estimation, calculate spatial division multiple access (SDMA) weights based on the combined channel estimation, and send a plurality of signals to the receivers using the calculated SDMA weights.

Certain aspects of the present disclosure provide an access point. The access point generally includes at least one antenna, an estimator configured to estimate a plurality of wireless channels between the access point and at least two wireless nodes, wherein a channel estimation of at least one of the wireless nodes is obtained differently compared to other wireless nodes, and the channel estimations are obtained either through explicit feedback from one of the wireless nodes to the access point comprising a channel state information (CSI) or a compressed representation of the CSI, or implicit estimation of a channel from the access point to the wireless nodes using a channel from the wireless node to the access point, a combiner configured to combine the channel estimations to obtain a combined channel estimation, a circuit configured to calculate spatial division multiple access (SDMA) weights based on the combined channel estimation, and a transmitter configured to send via the at least one antenna a plurality of signals to the wireless nodes using the calculated SDMA weights.

Certain aspects of the present disclosure provide a method for wireless communications. The method generally includes generating a signal comprising a plurality of spatial streams intended for a plurality of receivers, including one or more long training fields (LTFs) in a preamble of the signal, wherein a number of the LTFs is sufficient to train all the spatial streams for all the receivers, and transmitting the preamble and the signal to one or more of the receivers.

Certain aspects of the present disclosure provide an apparatus for wireless communications. The apparatus generally includes a first circuit configured to generate a signal comprising a plurality of spatial streams intended for a plurality of other apparatuses, a second circuit configured to include one or more long training fields (LTFs) in a preamble of the signal, wherein a number of the LTFs is sufficient to train all the spatial streams for all the other apparatuses, and a transmitter configured to transmit the preamble and the signal to one or more of the other apparatuses.

Certain aspects of the present disclosure provide an apparatus for wireless communications. The apparatus generally includes means for generating a signal comprising a plurality of spatial streams intended for a plurality of other apparatuses, means for including one or more long training fields (LTFs) in a preamble of the signal, wherein a number of the LTFs is sufficient to train all the spatial streams for all the other apparatuses, and means for transmitting the preamble and the signal to one or more of the other apparatuses.

Certain aspects of the present disclosure provide a computer-program product for wireless communications. The computer-program product includes a computer-readable medium comprising instructions executable to generate a signal comprising a plurality of spatial streams intended for a plurality of receivers, include one or more long training fields (LTFs) in a preamble of the signal, wherein a number of the LTFs is sufficient to train all the spatial streams for all the receivers, and transmit the preamble and the signal to one or more of the receivers.

Certain aspects of the present disclosure provide an access point. The access point generally includes at least one antenna, a first circuit configured to generate a signal comprising a plurality of spatial streams intended for a plurality of wireless nodes, a second circuit configured to include one or more long training fields (LTFs) in a preamble of the signal, wherein a number of the LTFs is sufficient to train all the spatial streams for all the wireless nodes, and a transmitter configured to transmit the preamble and the signal via the at least one antenna to one or more of the wireless nodes.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the present disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects. Also as used herein, the term "legacy stations" generally refers to wireless network nodes that support 802.11n or earlier versions of the IEEE 802.11 standard.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA) or some other standards. An OFDM system may implement IEEE 802.11 or some other standards. A TDMA system may implement GSM or some other standards. These various standards are known in the art.

An Example MIMO System

Figure 1:
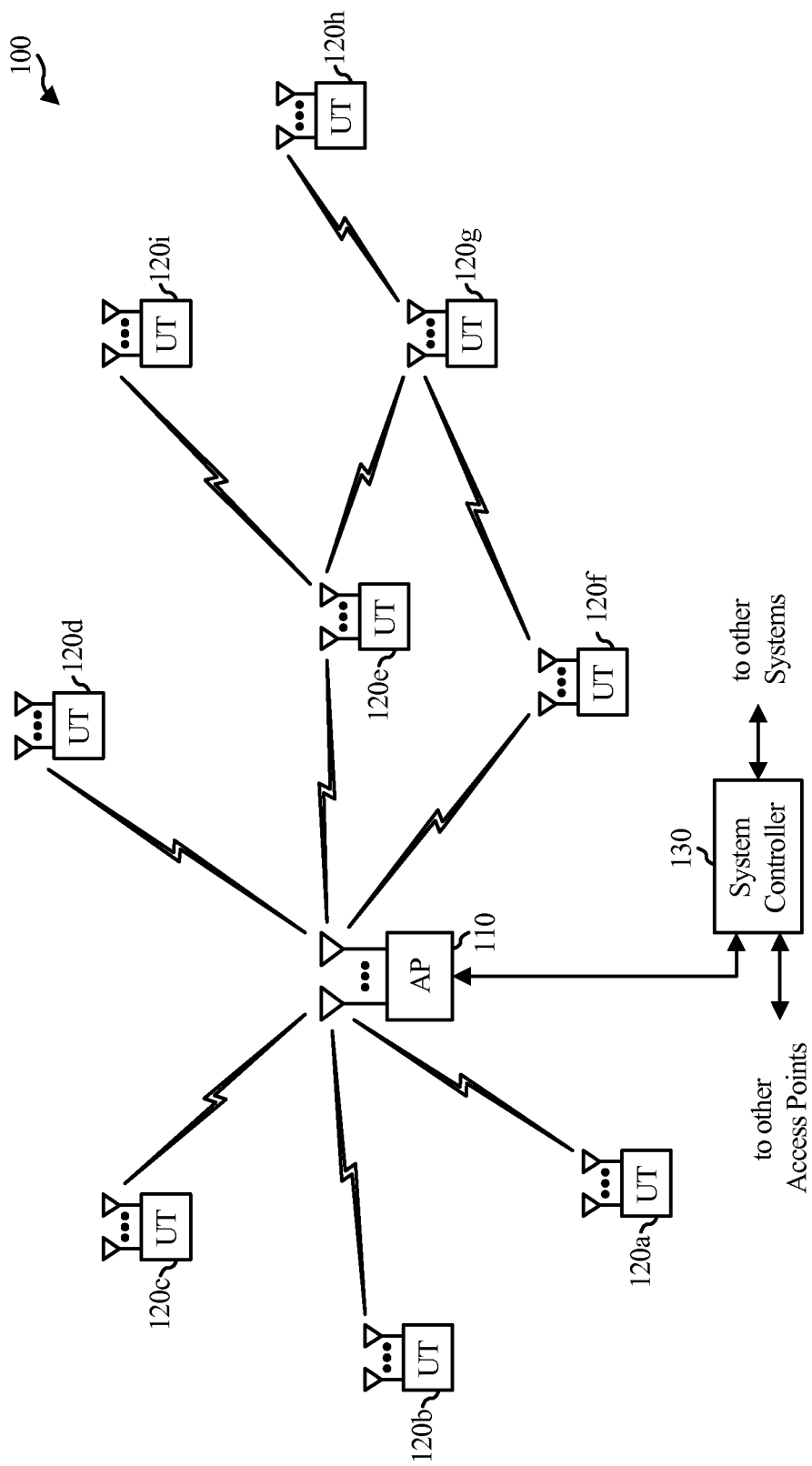
FIG. 1 illustrates a diagram of a wireless communications network in accordance with certain aspects of the present disclosure.

FIG. 1 illustrates a multiple-access MIMO system 100 with access points and user terminals. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a station (STA), a client, a wireless device or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. In case of SMDA or Multi-User MIMO, a set $N_u$ of selected user terminals 120 collectively represents the multiple-output for downlink transmissions and the multiple-input for uplink transmissions. In certain cases, it may be desirable to have $N_{ap} \geq N_u \geq 1$ if the data symbol streams for the $N_u$ user terminals are not multiplexed in code, frequency or time by some means. $N_u$ may be greater than $N_{ap}$ if the data symbol streams can be multiplexed using different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
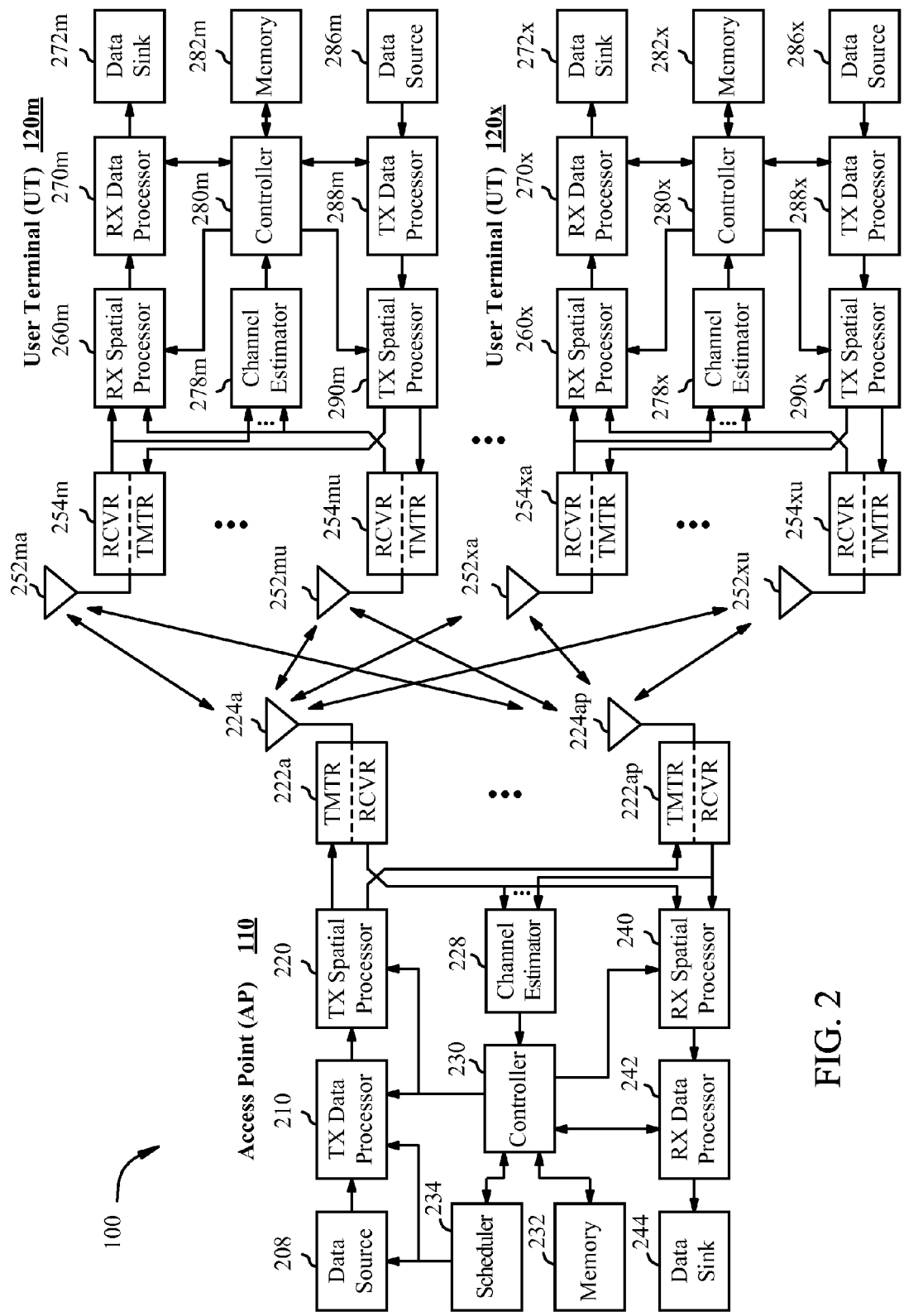
FIG. 2 illustrates a block diagram of an example access point and user terminals in accordance with certain aspects of the present disclosure.

FIG. 2 shows a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC) or some other technique. Each recovered uplink data symbol stream $\{s_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{s_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE or some other technique. An RX data processor 270 processes (e.g., demodulates, deinterleaves, and decodes) the recovered downlink data symbol stream to obtain decoded data for the user terminal.

Figure 3:
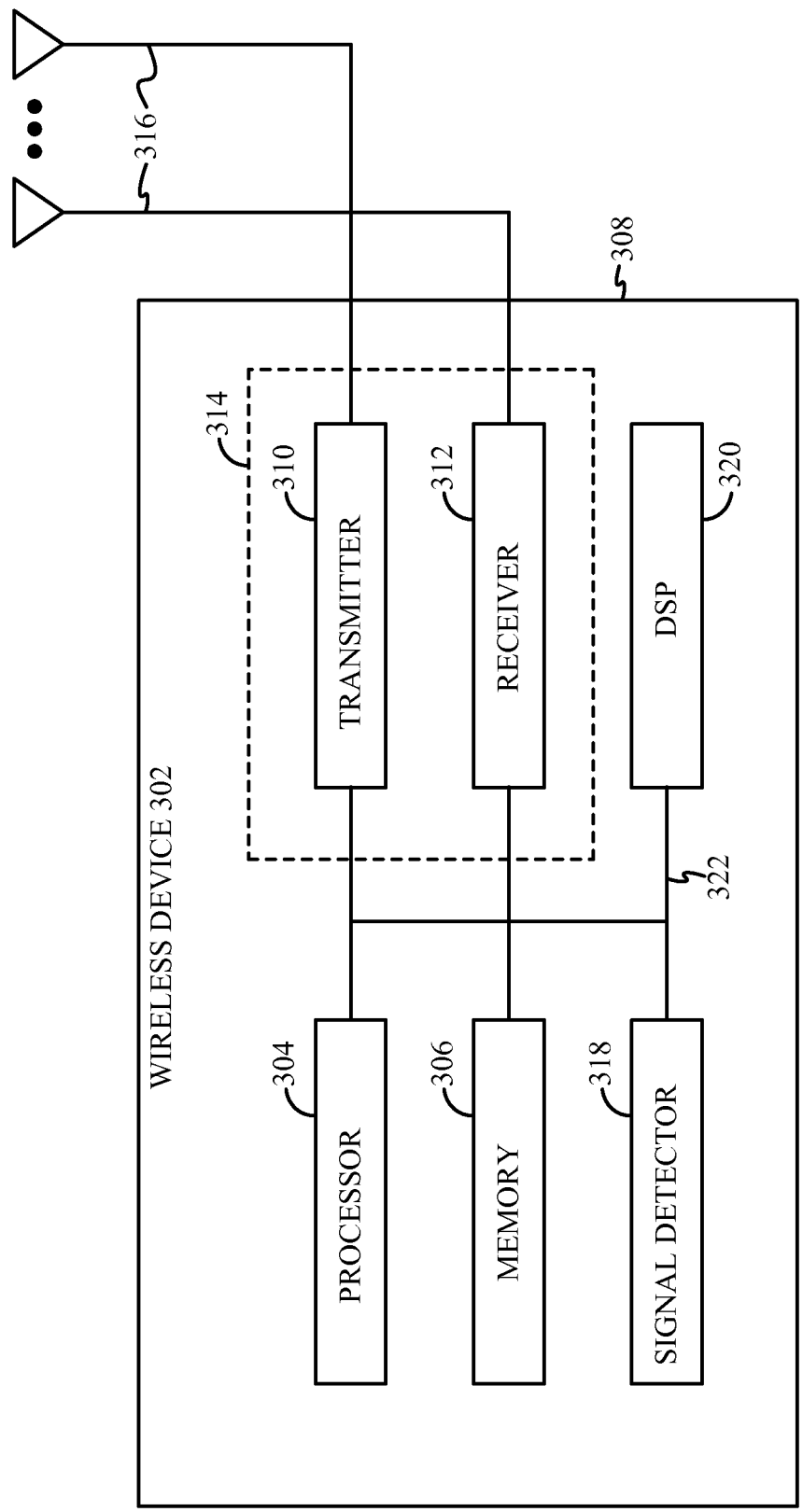
FIG. 3 illustrates a block diagram of an example wireless device in accordance with certain aspects of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304, which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Those skilled in the art will recognize the techniques described herein may be generally applied in systems utilizing any type of multiple access schemes, such as SDMA, OFDMA, CDMA, SDMA and combinations thereof.

Flexible SDMA—Interference Suppression in SDMA

Certain aspects of the present disclosure provide interference suppression techniques for SDMA when number of receive antennas on a receiver is equal to or more than number of spatial streams targeted to the receiver. The receiver may perform interference suppression using the signals received by all of its antennas that may result in a more robust system. In addition, certain aspects of the present disclosure propose algorithms to combine multiple forms of channel and/or beamforming matrix feedback into a single SDMA transmission.

Beamforming and SDMA may be used in MIMO communication systems to further enhance spectral efficiency, particularly when mobile stations support less spatial streams than the AP. In this document, the term beamforming refers to beamed transmissions to a single station at a time, which is performed to enhance rate and/or range of the station. In addition, the term SDMA is used to cover beamed transmissions to two or more stations at the same time, particularly to enhance the network throughput when individual transmissions to each of the stations are rate limited.

In this document, the focus is in downlink SDMA, in which an access point (AP) transmits beamformed or SDMA signals and one or more stations receive them. However, one skilled in the art would appreciate that these techniques may be extended to uplink SDMA and multi-user MIMO, using additional synchronization requirements and/or information exchange of channel estimates, or beamforming and SDMA weights.

In certain SDMA transmissions, only as much training is steered towards each station as needed for the number of spatial streams that are targeted to the station. In this case, the stations cannot directly train the channels from the interfering streams, which makes it more difficult to perform interference suppression. If available estimate of the downlink channel to a particular station allows for more spatial streams than the side that performs SDMA (e.g., an AP) is planning to send, spatial expansion may be done to fill up the available channel dimensions. However, spatial expansion may result in loss of beamforming or SDMA gain. To prevent performance loss, before transmitting the SDMA data, the transmitter may signal to the station to turn off the surplus of its receive antennas.

However, for certain aspects of the present disclosure, the surplus of receive antennas may be used to perform interference suppression. The proposed interference suppression technique may result in a more robust system against noise and/or aging of the channel estimates available at the transmitter (e.g., the AP). It should be noted that in this document it is assumed that the AP performs the SDMA transmission, however, the proposed techniques may be used by any wireless devices.

As proposed, the surplus of receive antennas at a station, when it is receiving a downlink SDMA transmission, may be used to improve performance by utilizing interference suppression. Interference suppression in SDMA may have one or more of the following advantages: i) Improved robustness against aging of the channel estimate available at the SDMA transmitter; ii) Improved robustness against noise on the channel estimate available at the SDMA transmitter; iii) The ability to use more receive antennas than the number of spatial streams at the station. As a result, the surplus of receive antennas that might be available at the receiver may not need to be turned off, but may be used to enhance the performance; and iv) The ability to tradeoff performance versus amount of quantization used for the explicit feedback of the downlink channel estimate from the station to the SDMA transmitter.

For certain aspects, in order to support interference suppression, a station receiving a downlink SDMA signal may be able to train the effective channel after receiving SDMA pre-coding signals from all of the spatial streams, including one or more spatial streams intended for other stations. The station may also need to know which spatial streams are assigned to it.

Figure 4:
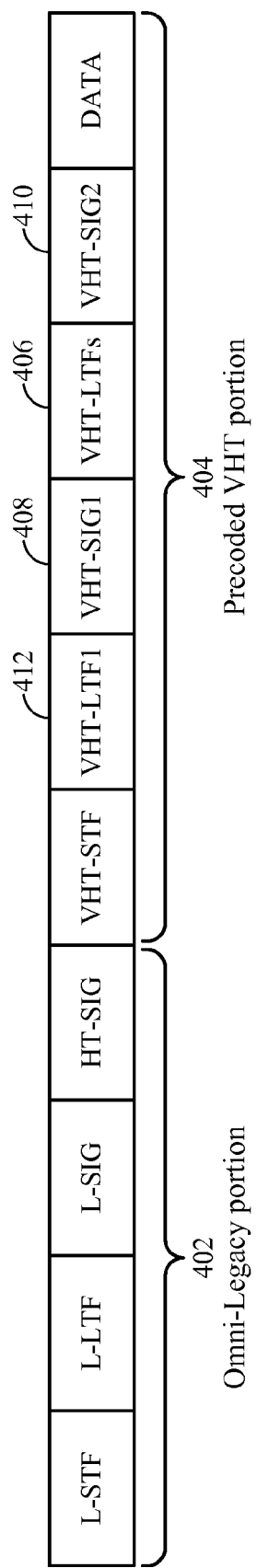
FIG. 4 illustrates an example preamble structure that may support interference suppression in downlink SDMA in accordance with certain aspects of the present disclosure.

FIG. 4 illustrates an example preamble structure that supports interference suppression in downlink SDMA, in accordance with certain aspects of the present disclosure. The preamble may consist of two portions, such as an Omni-legacy portion 402 and a pre-coded portion 404.

The Omni-legacy portion 402 may include a (legacy) short training (L-STF) field, a long training (L-LTF) field, a signal (L-SIG) field and a high throughput signal (HT-SIG) field. The Omni-legacy portion of the preamble may be transmitted to all the stations without any beamforming. This portion may be targeted to legacy devices that may be compliant with the IEEE 802.11n/a/b/g standards.

The pre-coded portion 404 of the preamble may include a very high throughput STF (VHT-STF) field, a VHT-LTF1 field 412, a very high throughput signal field 408 (the VHT-SIG1 field) and one or more VHT-LTF fields 406, and a VHT-SIG2 field 410 that may be followed by SDMA data. The pre-coded portion of the preamble may be beamformed or transmitted using SDMA. The pre-coded portion 404 of the preamble may be targeted to stations with high throughput that support beamforming, or to stations that support enhancements of the IEEE 802.11n/a/b/g standards.

The number of LTFs 406, together with information about which spatial streams are assigned to which station may be included in the VHT-SIG1 field 408, which may be similar for all the stations. The other VHT-SIG field (i.e., the VHT-SIG2 field 410) may be station-specific and may contain information such as the modulation type, coding rate, and a length of transmission packet dedicated for each station.

For certain aspects, the VHT-LTF1 field 412 and VHT-LTF fields 406 are chosen such that all of the spatial streams can be trained. When a station intends to perform interference suppression, the station may train for all spatial streams. When a station decides not to perform interference suppression, the station may only train for the spatial streams intended for it, based on the information obtained from the VHT-SIG1 field 408.

Flexible SDMA

Certain aspects of the present disclosure propose algorithms to combine multiple forms of channel and/or beamforming matrix feedback into a single Spatial-Division Multiple Access (SDMA) transmission.

In order to perform beamforming or SDMA to one or more destinations, an AP needs to know the downlink channels and/or beamforming matrices corresponding to the downlink channels. The knowledge of the downlink channels may be obtained either explicitly or implicitly. In the explicit method, the AP may send a channel training sequence with proper spatial dimensions to the station it wants to beamform to, or to the stations it wants to include in an SDMA transmission. The stations may be able to measure/estimate the downlink channel. Once the channel is estimated, the stations may feed the estimated downlink channel or beamforming matrix that is derived from the downlink channel back to the AP.

One of the advantages of the explicit channel estimation is that the AP does not have to have the same number of transmit antennas as receive antennas, unlike the implicit method, which requires the same number of transmit and receive chains at the AP. Another advantage of the explicit method is that calibration of the gain and phase differences between the receive antennas and transmit antennas of the AP may not be required. A further advantage of the explicit method over the implicit method is that the explicit method may be used in frequency-division duplex (FDD) systems.

For beamforming or SDMA based on the implicit channel estimation method, the downlink channel may implicitly be determined by observing the uplink channel at the AP (assuming time-division duplex (TDD) communication). The uplink channel may then be transposed and, when necessary, corrected for any relative gain and phase differences in each receive and transmit chain pair. These gain and phase differences may be estimated through calibration. The implicit channel estimation method may require the same number of active receive chains as active transmit chains at the AP.

An implicit estimate of the downlink channel for a station may be given as follows:

$$H = H_{uplink}{}^T C, \tag{1}$$

where $H_{uplink}$ may represent the narrowband (combined) uplink channel (e.g., of one of OFDM(A) subcarriers) of the station that is a target for either beamforming or SDMA transmission. The $H_{uplink}$ may consist of $N_{tx} \times N_{rx}$ complex elements, where $N_{tx}$ is the number of transmit antennas at the AP and $N_{rx}$ is the number of receive antennas at the station. $(.)^T$ represents transpose of the corresponding matrix. The matrix C may be a diagonal matrix with complex elements that are used to correct for relative gain and phase differences in each receive and transmit chain pair. The gain differences may also include relative differences in the gain settings of each receiver chain when $H_{uplink}$ is observed.

The IEEE 802.11n standard, supports different types of beamforming, such as, implicit beamforming, explicit beamforming using Channel State Information (CSI) feedback, and explicit beamforming using beamforming matrix feedback, either compressed or non-compressed.

For certain aspects of the present disclosure, a method is proposed that combines different types of IEEE 802.11n beamforming methods in a single SDMA transmission, resulting in more flexibility of the system.

Figure 5:
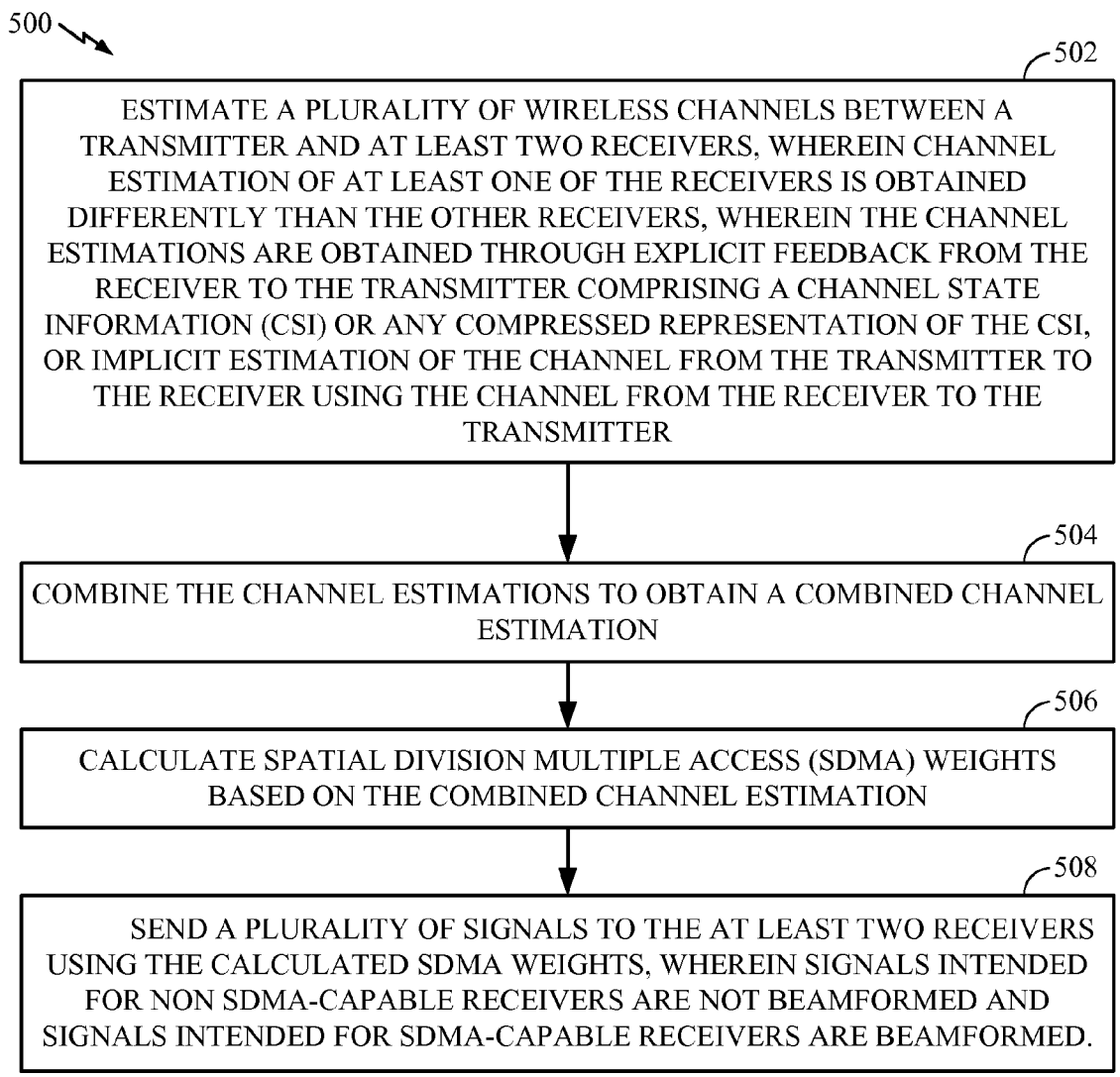
FIG. 5 illustrates example transmitter-side operations for a flexible spatial-division multiple access (SDMA) network in accordance with certain aspects of the present disclosure.

FIG. 5 illustrates example transmitter-side operations 500 for a flexible SDMA network, in accordance with certain aspects of the present disclosure. At 502, a transmitter (e.g., an access point) may perform channel estimation for wireless channels between the access point and at least two receivers (e.g., wireless nodes) of the SDMA network. Channel estimation of at least one of the wireless nodes may be obtained differently than for the other wireless nodes. The channel estimations may be obtained either through explicit feedback from the wireless node to the access point comprising a CSI or any compressed representation of the CSI, or implicit estimation of the channel from the access point to the wireless node using the channel from the wireless nodes to the access point.

At 504, the access point may stack the explicit channel estimation and the implicit channel estimation to obtain combined channel estimation. At 506, the access point may calculate SDMA weights based on the combined channel estimation. At 508, the access point may transmit one or more signals to the at least two wireless nodes using the calculated SDMA weights or derivatives of the SDMA weights, wherein a first part of the signals intended for non SDMA-capable receivers may not be beamformed and the second part of the signals intended for SDMA-capable receivers may note be beamformed. In one aspect, the access point may transmit at least one of a total number of spatial streams and perform mapping of one or more spatial streams intended for each of the receivers in a packet before the SDMA transmission.

Figure 6:
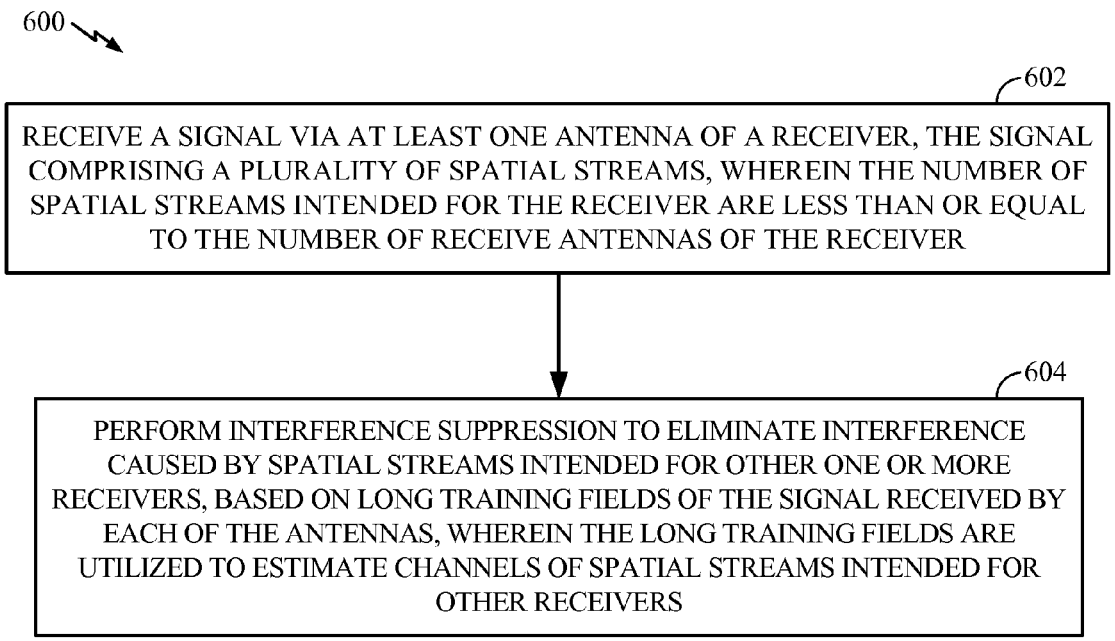
FIG. 6 illustrates example receiver-side operations for interference suppression in downlink SDMA in accordance with certain aspects of the present disclosure.

FIG. 6 illustrates example receiver-side operations 600 for interference suppression in downlink SDMA, in accordance with certain aspects of the present disclosure. At 602, a receiver (e.g., a wireless node) may receive a signal by one or more of its antennas. The signal may contain a plurality of spatial streams, wherein the number of spatial streams intended for the receiver is less than or equal to the number of receive antennas of the receiver, and the signal may comprise long training fields (LTFs) for each of the plurality of spatial streams. The receiver may receive, in a packet before reception of the signal, information about at least one of: a maximum number of the spatial streams, or information about the spatial streams intended for each of the receivers.

At 604, the receiver may perform interference suppression to eliminate interference caused by spatial streams intended for other one or more receivers, based on LTFs of the signal received by each of the one or more antennas of the receiver, wherein the LTFs are utilized to estimate channels of spatial streams intended for other receivers. For certain aspects, a decoder within the receiver may decode one or more spatial streams intended for the receiver using knowledge about spatial streams intended for the other receivers gained by performing interference suppression.

Figure 7:
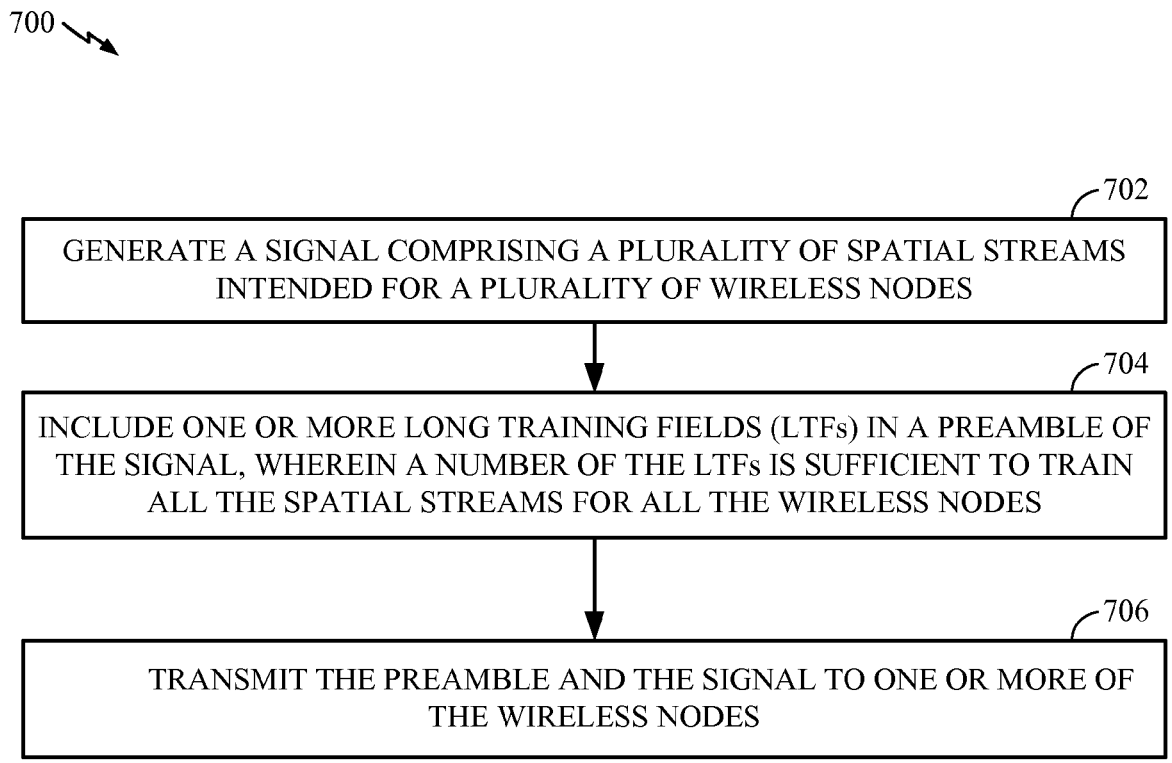
FIG. 7 illustrates other example transmitter-side operations in accordance with certain aspects of the present disclosure.

FIG. 7 illustrates example transmitter-side operations 700 in accordance with certain aspects of the present disclosure. At 702, a transmitter (e.g., an access point) may generate a signal comprising a plurality of spatial streams intended for a plurality of receivers (e.g., wireless nodes). At 704, the access point may include one or more LTFs in a preamble of the signal, wherein a number of the LTFs may be sufficient to train all the spatial streams for all the receivers. At 706, the access point may transmit the preamble and the signal to one or more of the receivers.

Signal Model

To explain the proposed method, narrowband multi-antenna downlink channels with flat-fading may be assumed that are utilized by i stations. The $i^{th}$ station may be equipped with $N_{rx,i}$ receive antennas, and the AP may have $N_{tx}$ transmit antennas. Such a narrowband channel could, for example, be observed on an OFDM(A) subcarrier.

A discrete-time complex baseband signal $y^{(i)}$ received by the $i^{th}$ station through the narrowband channel may be modeled as follows:

$$y^{(i)} = H^{(i)} x + n^{(i)}, i = 1, \ldots, I, \tag{2}$$

where $H^{(i)}$ represents the $N_{rx,i} \times N_{tx}$-dimensional channel to the $i^{th}$ station containing complex elements, x may be the $N_{tx}$-dimensional complex vector transmitted by the AP, and $n^{(i)}$ may be an $N_{rx,i}$-dimensional complex vector representing additive white Gaussian noise at the $i^{th}$ station.

It may be assumed that the AP has enough information available to transmit SDMA signals to all the i stations. The AP may perform a ZF or MMSE-type SDMA. Without loss of generality, in this document, the ZF-type SDMA is described.

In zero forcing SDMA (ZF-SDMA), the required information for performing SDMA with $N_{ss,i}$ spatial streams to the $i^{th}$ station may be captured in the $N_{ss,i} \times N_{tx}$-dimensional matrix $G^{(i)}$ (with $N_{ss,i} \leq N_{rx,i}$). Therefore, a combined $N_{tx} \times N_{ss,tot}$-dimensional ZF-SDMA weight matrix $W_{tot}$ may be written as follows:

$$\begin{aligned} W_{tot} &= P^{\frac{1}{2}} pinv\left(\begin{pmatrix} G^{(1)} \\ \vdots \\ G^{(I)} \end{pmatrix}\right) Q^{\frac{1}{2}} \\ &= P^{\frac{1}{2}} pinv(G_{tot}) Q^{\frac{1}{2}} \\ &= P^{\frac{1}{2}} G_{tot}^H Q^{\frac{1}{2}} \left(Q^{\frac{1}{2}} G_{tot} G_{tot}^H Q^{\frac{1}{2}}\right)^{-1}, \end{aligned} \tag{3}$$

where pinv(.) represents the pseudo-inverse of the corresponding matrix, and P and Q are diagonal matrices that may be used to optimize power per transmit antenna and power per spatial stream, respectively.

For MMSE-type SDMA, the SDMA weight matrix $W_{tot}$ may be calculated as follows:

$$W_{tot} = P^{\frac{1}{2}} G_{tot}^H Q^{\frac{1}{2}} \left( A + Q^{\frac{1}{2}} G_{tot} G_{tot}^H Q^{\frac{1}{2}} \right)^{-1}, \quad (4)$$

where A is a diagonal matrix whose elements are expected noise power values per spatial stream. When Q is properly selected, the diagonal elements of A may also be set to a single value per station, such as $\alpha_i$, or even to a single value over all stations, such as $\alpha$.

Given that $N_{ss,i}$ spatial streams are sent to each station, the weight matrix $W_{tot}$ may be broken into i sub-matrices $W^{(i)}$, with the $i^{th}$ sum-matrix having $N_{ss,i}$ columns from the original weight matrix $W_{tot}$. The transmitted signal x may be written as follows:

$$x = \sum_{i=1}^{I} W^{(i)} s^{(i)}, \quad (5)$$

where $s^{(i)}$ is the $N_{ss,i}$-dimensional complex vector representing the symbols for station i, and $W^{(i)}$ is the SDMA weight matrix for station i.

Beamforming Methods

The IEEE 802.11n standard supports different types of beamforming. In this section, the information that the AP receives either implicitly or explicitly through a feedback report and a proposed Eigenmode Selection (ES) method are described.

In both the implicit beamforming method and the explicit beamforming using CSI Feedback, the AP obtains an estimate of the downlink channel $H^{(i)}$ to each station i. In the explicit beamforming, using beamforming matrix feedback based on the IEEE 802.11n, a beamforming matrix $V^{(i)}$ is fed back by the station i.

The station may calculate $V^{(i)}$ by performing an economy-size Singular Value Decomposition (SVD) on the downlink channel, such that $H^{(i)} = U^{(i)} D^{(i)} (V^{(i)})^H$, where $(.)^H$ represents the conjugate-transpose of the corresponding matrix, and $U^{(i)}$, $D^{(i)}$, and $V^{(i)}$ may in general have dimensions such as $N_{rx,i} \times N_{rx,i}$, $N_{rx,i} \times N_{rx,i} \times N_{rx,i}$, and $N_{tx} \times N_{rx,i}$, respectively.

For a compressed feedback, $V^{(i)}$ should consist of orthogonal columns. This property is used in the compression and $V^{(i)}$ may not actually be fed back, but only its compressed representation. The AP may utilize the compressed representation to reconstruct the beamforming matrix $V^{(i)}$.

For certain aspects of the present disclosure, an Eigenmode Selection (ES) method is proposed that not only feeds back the beamforming matrix $V^{(i)}$ (or its compressed representation), but also feeds back the singular values, which are on the diagonal of the matrix $D^{(i)}$.

The AP may choose to send less spatial streams than available singular values (i.e., than available Eigenmodes) to the station i. In that case, the AP may select the first (i.e., the best) $N_{ss,i}$ eigenvectors from $V^{(i)}$ and at least one singular value from $D^{(i)}$, such that $G^{(i)}$ could be written as follows:

$$G^{(i)} = D^{(i)}_{1:N_{ss,i}, 1:N_{ss,i}} \left( V^{(i)H} \right)_{1:N_{ss,i}}, \quad (6)$$

where the subscript $1:N_{ss,i}$ denotes the first $N_{ss,i}$ rows of the corresponding matrix and $1:N_{ss,i}, 1:N_{ss,i}$ denotes the upper-left $N_{ss,i} \times N_{ss,i}$ elements of the corresponding matrix.

One of the advantages of the proposed Eigenmode Selection method over the method that only uses the beamforming matrix $V^{(i)}$ is that when using SDMA with either ZF or MMSE, the eigenmodes get equalized such that the same rate on the spatial streams to a station may be used. The proposed Eigenmode Selection method in combination with MMSE SDMA may be called MMSE-ES.

For certain aspects, the proposed SDMA methods may be combined with the feedback methods described above. The AP may send SDMA signals to stations for which downlink CSI is available. When the AP has the CSI available for multiple stations, it may, for example, perform ZF-SDMA by setting $G^{(i)}$ for station i equal to $H^{(i)}$.

As an example, a 4-antenna AP and two stations such as station1 and station2 with one and two antennas, respectively, may be assumed. In this example, $H^{(1)}$ is 1×4 and $H^{(2)}$ is 2×4 and, in case of ZF-SDMA, the SDMA weight matrix $W_{tot}$ may be written as follows:

$$W_{tot} = pinv\left( \begin{pmatrix} H^{(1)} \\ H^{(2)} \end{pmatrix} \right). \quad (7)$$

When the AP sends one spatial stream to station1 and two spatial streams to station2 by applying the SDMA weight matrix $W_{tot}$, if the AWGN at the receiver side is ignored, station1 and station2 may see the following effective channels, respectively:

$$H^{(1)} W_{tot} = (1 \quad 0 \quad 0), \quad (8)$$

$$H^{(2)} W_{tot} = \begin{pmatrix} 0 & 1 & 0 \\ 0 & 0 & 1 \end{pmatrix}, \quad (9)$$

where each column of the effective channels describes how a spatial stream is weighted at the station side.

Therefore, in the ideal case, station1 may not see any interference from spatial streams 2 and 3 (i.e., the streams targeted to station2) because the corresponding columns of $H^{(1)} W_{tot}$ are zero, and station2 may not see any interference from spatial stream 1 (i.e., the stream targeted to station1), because the first column of $H^{(2)} W_{tot}$ is all zeros.

For certain aspects, when the AP doesn't have accurate knowledge of downlink CSI values, interference suppression may be performed at the station to mitigate multi-user interference. In that case, such a station may need to have additional degrees of freedom. A station that has more receive antennas than the number of spatial streams aimed for the station in the SDMA transmission, generally has additional degrees of freedom that it may use to mitigate interference.

For example, if station1 has two antennas, but the AP still sends one spatial stream to this station, and if the AP selects the first row of then $H^{(1)}_{2\times 4}$ for transmission, denoted by $H_1^{(1)}$, then the SDMA weight matrix may be written as follows:

$$W_{tot} = pinv\left(\begin{pmatrix} H_1^{(1)} \\ H^{(2)} \end{pmatrix}\right), \quad (10)$$

Therefore, station1 may see the following effective channel:

$$H_{eff}^{(1)} = H^{(1)}W_{tot} = \begin{pmatrix} 1 & 0 & 0 \\ c_1 & c_2 & c_3 \end{pmatrix}, \quad (11)$$

where $c_x$ is a complex value. Station1 may be capable of training the 2×3 effective channel by utilizing a 3-spatial-stream training. Therefore, it may compute an MMSE weight from the effective channel and utilize it to obtain a channel estimate, as follows:

$$W_{MMSE}H_{eff}^{(1)} = H_{eff}^{(1)H}(\alpha I + H_{eff}^{(1)}H_{eff}^{(1)H})^{-1}H_{eff}^{(1)} \approx \begin{pmatrix} 1 & 0 & 0 \\ 0 & c_{22} & c_{23} \\ 0 & c_{32} & c_{33} \end{pmatrix}. \quad (12)$$

As a result, station1 may extract the first spatial stream that is targeted to it. It should be noted that station1 may only need one extra receive antenna to mitigate interference from the two streams of station2. This is possible because of utilizing the ZF or MMSE-type SDMA at the AP.

Furthermore, size of the matrix that needs to be inverted in the MMSE weight of station1 may be equal to $N_{rx,1} \times N_{rx,1}$, which is 2×2 in this example. Also, station1 may only be interested in its own spatial stream, therefore, eqn. (12) may be simplified to the following equation:

$$(W_{MMSE})_1 H_{eff}^{(1)} = (H_{eff}^{(1)H})_1 (\alpha I + H_{eff}^{(1)}H_{eff}^{(1)H})^{-1} H_{eff}^{(1)} \approx (1 \; 0 \; 0), \quad (13)$$

where $(.)_1$ stands for the first row of the corresponding matrix.

SDMA To Devices that Support Explicit Beamforming Matrix Feedback

The ZF or MMSE-type SDMA may also be applied to devices that support explicit beamforming matrix feedback. As an example, a 4-antenna AP and two stations (e.g., station1 and station2) each having two antennas may be considered. The combined channel from the AP to the stations may be a 4×4 matrix H. The first two rows of H may represent the channel to station1, $H^{(1)}$, and the second two rows of H may represent the channel to station2, $H^{(2)}$. The "economy size" SVD performed by each of the stations, may be written as follows:

$$H^{(1)} = U^{(1)}D^{(1)}V^{(1)H} \text{ and } H^{(2)} = U^{(2)}D^{(2)}V^{(2)H}. \quad (14)$$

If the AP calculates a ZF matrix from the combined SVD beamforming matrices that it has received, the following SDMA weight matrix may be calculated:

$$W_{tot} = pinv\left(\begin{pmatrix} V^{(1)H} \\ V^{(2)H} \end{pmatrix}\right). \quad (15)$$

Note that, in general, the matrix generated from the combined SVD beamforming matrices may not result in a unitary matrix, since the columns of $V^{(1)}$ may not be orthogonal to the columns of $V^{(2)}$.

When the AP applies the above SDMA weight matrix, station1 and station2 may see the following effective channels, respectively:

$$H^{(1)}W_{tot} = (U^{(1)}D^{(1)}0_{2\times 2}), \quad (16)$$

$$H^{(2)}W_{tot} = (0_{2\times 2} U^{(2)}D^{(2)}), \quad (17)$$

where $0_{2\times 2}$ represents a 2×2 matrix with all-zero elements. As a result, the transmitter may send the data to station1 on spatial streams 1 and 2 and to station2 on spatial streams 3 and 4, respectively. Each station may be able to receive its own data if proper training is used.

In this example, the number of spatial streams targeted to each station equals to the number of receive antennas of the station. Since no dedicated spatial processing is needed at the stations, the stations may just use their MIMO detector.

As a second example, a 4-antenna AP and two 3-antenna stations may be considered. Therefore, the combined channel from the AP to the stations may be a 6×4 matrix H, where the first three rows of H may represent the channel to station1, $H^{(1)}$, and the next three rows of H may represent the channel to station2, $H^{(2)}$. The "economy size" SVD done by station1 and station2 may result in the following equations, respectively:

$$H^{(1)} = U^{(1)}D^{(1)}V^{(1)H} \text{ and } H^{(2)} = U^{(2)}D^{(2)}V^{(2)H}. \quad (18)$$

Given that the AP with four transmit antennas may only support a total of four spatial streams, each station or the AP may select two columns from $V^{(1)}$ and $V^{(2)}$, respectively. In the case the station does the selection, the station may feed back the selected columns back in $V'^{(1)}$ and $V'^{(2)}$, respectively, such that $V'^{(i)}$ is formed from two columns from $V^{(i)}$, in which i={1,2}.

After receiving the $V'^{(1)}$ and $V'^{(2)}$ matrices, the AP may create a ZF-SDMA weight matrix, as follows:

$$W_{tot} = pinv\left(\begin{pmatrix} V'^{(1)H} \\ V'^{(2)H} \end{pmatrix}\right). \quad (19)$$

In this example, however, the stations need to apply dedicated spatial filtering or interference suppression in order to separate different spatial streams. When the selected two columns on $V'^{(1)}$ and $V'^{(2)}$ correspond to the first and second diagonal entries in $D^{(1)}$ and $D^{(2)}$, respectively, then the stations may see the following effective channels:

$$H_{eff}^{(1)} = U^{(1)}D^{(1)}V^{(1)H}W_{tot} = U^{(1)}D^{(1)}\begin{pmatrix} 1 & 0 & 0 & 0 \\ 0 & 1 & 0 & 0 \\ c_1 & c_2 & c_3 & c_4 \end{pmatrix}, \quad (20)$$

$$H_{eff}^{(2)} = U^{(2)}D^{(2)}V^{(2)H}W_{tot} = U^{(2)}D^{(2)}\begin{pmatrix} 0 & 0 & 1 & 0 \\ 0 & 0 & 0 & 1 \\ c_1 & c_2 & c_3 & c_4 \end{pmatrix}, \quad (21)$$

where $c_x$, x=1, ... 4 are complex values, that are most likely different for each station. As a result, the first two eigenmodes to each station may contain the allocated streams, whereas the third eigenmode to each station may include interference from the other station.

For certain aspects, at least two methods may be used to filter out the two wanted eigenmodes at each of the stations. The first method may be using dedicated spatial filtering, in which the dedicated processing for station i consists of the Hermitian transpose of the first two columns of $U^{(i)}$. The dedicated spatial stream may result in the following effective diagonal channels for station1 and station2, respectively:

$$\left(U^{(1)H}\right)_{1:2} H^{(1)} W_{tot} = \begin{pmatrix} D_{11}^{(1)} & 0 & 0 & 0 \\ 0 & D_{22}^{(1)} & 0 & 0 \end{pmatrix}, \quad (22)$$

$$\left(U^{(2)H}\right)_{1:2} H^{(2)} W = \begin{pmatrix} 0 & 0 & D_{11}^{(2)} & 0 \\ 0 & 0 & 0 & D_{22}^{(2)} \end{pmatrix}. \quad (23)$$

Therefore, each station may be able to estimate the data on the two spatial streams targeted to it. Note that, since the effective diagonal channel consists of the first two singular values, when these singular values are not equal, unequal rate/modulation on the two eigenmodes may result in better throughput than equal rate/modulation.

The second method to filter out the two wanted eigenmodes at each of the stations may be based on multiuser detection. In multi-user detection or interference suppression, an MMSE weight may be calculated the effective channel matrix $H_{eff}^{(i)}$ may be inverted. By multiplying the effective 3×4-dimensional channel matrix $H_{eff}^{(1)}$ with a pseudo-inverse of $H_{eff}^{(1)}$, the following equation may result:

$$H_{eff}^{(1)H} \left(H_{eff}^{(1)} H_{eff}^{(1)H}\right)^{-1} H_{eff}^{(1)} = \begin{pmatrix} 1 & 0 & 0 & 0 \\ 0 & 1 & 0 & 0 \\ 0 & 0 & c_{33} & c_{34} \\ 0 & 0 & c_{43} & c_{44} \end{pmatrix}. \quad (24)$$

Since only the first two streams are needed at the station1, the above equation may be simplified as follows:

$$\left(H_{eff}^{(1)H}\right)_{1:2} \left(H_{eff}^{(1)} H_{eff}^{(1)H}\right)^{-1} H_{eff}^{(1)} = \begin{pmatrix} 1 & 0 & 0 & 0 \\ 0 & 1 & 0 & 0 \end{pmatrix}. \quad (25)$$

In this method, the station may need to calculate an inverse matrix with a size equal to number of its active receive antennas. It should be noted that the station may only need one receive antenna more than the number of spatial streams it receives or can receive to benefit from this method.

Note that if MMSE-ES is applied in this example that has a 4-antenna AP and two 3-antenna stations, the ZF or MMSE-type SDMA weight is calculated from a combination of $D^{(i)} V'^{(i)H}$, instead of a combination of $V'^{(i)H}$ matrices.

Flexible SDMA

Certain aspects of the present disclosure present flexible SDMA technique in which a plurality of feedback types may be combined in one SDMA transmission utilizing ZF, MMSE or other methods.

An example is presented to assist the description of the proposed Flexible SDMA technique, however, those skilled in the art would appreciate the fact that the proposed scheme may be used for any general scenario. A 4-antenna AP may be considered with three stations, station1, station2 and station3.

Station1 may utilize one receive antenna and support implicit beamforming in compliance with the IEEE 802.11n standard. The AP may obtain the downlink CSI from an uplink transmission such as a sounding signal, such that $G^{(1)}=H^{(1)}$ which is $1 \times N_{tx}$-dimensional and the transpose of the uplink channel.

Station2 may also utilize one receive antenna and send explicit feedback in compliance with the IEEE 802.11n standard. The feedback may be a beamforming matrix obtained from the economy-size SVD of $H^{(2)}$, $H^{(2)}=U^{(2)}D^{(2)}V^{(2)H}$, such that $G^{(2)}=V^{(2)H}$ is $1 \times N_{tx}$-dimensional and $D^{(2)}$ contains one singular value.

Station3 may have two receive antennas and may support MMSE-ES and interference suppression for which the AP selects one eigenmode, such that $G^{(3)}=D'^{(3)}V'^{(3)H}$, where $V'^{(3)}$ is the first eigenvector of $V^{(3)}$ and $D'^{(3)}$ is the first singular vector.

For an SDMA technique utilizing ZF, the SDMA weight matrix may be written as follows:

$$W_{tot} = pinv\left(\begin{pmatrix} G^{(1)} \\ G^{(2)} \\ G^{(3)} \end{pmatrix}\right) = pinv\left(\begin{pmatrix} H^{(1)} \\ V^{(2)H} \\ D'^{(3)} V'^{(3)H} \end{pmatrix}\right). \quad (26)$$

When applying the above SDMA weight matrix at the AP, the effective channels seen by each station may be written as follows:

$$H^{(1)} W_{tot} = (1 \quad 0 \quad 0), \quad (27)$$

$$H^{(2)} W_{tot} = (0 \quad D^{(2)} \quad 0), \quad (28)$$

$$H^{(3)} W_{tot} = U^{(3)} \begin{pmatrix} 0 & 0 & 1 \\ c_1 & c_2 & c_3 \end{pmatrix} \quad (29)$$

Without much processing, station1 and station2 may obtain their respective spatial streams. Station3 may filter out its spatial stream by applying a specific spatial filter, such as the Hermitian transpose of the first column of $U^{(3)}$, or by applying interference suppression as described above.

For certain aspects of the present disclosure, there may be some limitations to the flexible SDMA technique. For example, when a station is unable to switch off an antenna, or when a station does not store its U matrix to perform the dedicated spatial filtering, which is probably true for most of the devices utilizing the IEEE 802.11n standard, and when a station does not support interference suppression, the AP should null out all the active receive antennas or corresponding active eigenmodes. The AP may either use a rate with $N_{ss,i}$ equal to $N_{rx,i}$, or use less spatial streams and copy/spatially expand them on the $N_{rx,i}$ available streams. In the SDMA transmission, the AP may send a training to these stations that allows for channel training of $N_{rx,i}$ spatial streams.

When the AP knows that a station supports interference suppression, in the SDMA transmission, the AP may provide a training for $N_{ss,tot}$ streams. The station may then train the $N_{rx,i} \times N_{ss,tot}$ channel and perform interference suppression with the trained channel. Note that during the sounding and SDMA transmission, the station may need one active receive antenna more than its $N_{ss,i}$ allocated spatial streams in the SDMA transmission to potentially have a performance gain by utilizing the interference suppression method.

Preamble Requirements to Support Interference Suppression

In interference suppression, a station may train for all the spatial streams (e.g., $N_{ss,tot}$) that it may support. Therefore, other stations that do not apply interference suppression but are part of the same SDMA transmission should be aware of the fact that another station is performing interference suppression. Because each station need to anticipate a training signal with a length corresponding to the total number of spatial streams for all stations.

Note that if none of the stations performs interference suppression, the assumption is that for each station, the AP sufficiently nulls the signals from the other stations. As a result, in the SDMA transmission, it may be sufficient to send a training to each station that is required to help the station detect its allocated spatial streams.

If one station supports interference suppression, the training to all the stations may be equal to the training to the station that supports interference suppression. For example, in the example presented above, the training to all the stations should be three spatial streams. For example, in the IEEE 802.11n training, the plurality of long training fields may be transmitted as shown in the following table:

| SS 1: | HT-LTF | −HT-LTF | HT-LTF  | HT-LTF  |
|-------|--------|---------|---------|---------|
| SS 2: | HT-LTF | HT-LTF  | −HT-LTF | HT-LTF  |
| SS 3: | HT-LTF | HT-LTF  | HT-LTF  | −HT-LTF |

If station1 and station2 are not performing interference suppression, they need to know the total number of spatial streams and which spatial stream(s) is/are assigned to them to compensate for the correct polarity of the HT-LTFs. Note that, even though only one spatial stream may be "beamed" to each of the stations, station1 and station2 may receive four HT-LTF fields because of the training required for station3, which includes three spatial streams.

For certain aspects, each station (e.g., station3) needs to apply interference suppression to be able to detect a multi-spatial-stream signal field (i.e., a station-specific signal field) in an SDMA transmission. Therefore, the station-specific signal fields should be transmitted after the multi-user training fields.

For certain aspects, the stations should know the total number of spatial streams and the spatial streams that are assigned to them, to be able to recognize long-training field polarity and/or to filter out their own spatial stream(s) during interference suppression.

For certain aspects, information about the total number of spatial streams and the streams assigned to each station may be transmitted through either a signaling packet sent before the SDMA transmission, or a common signal field. This could be VHT-SIG1 408 in FIG. 4, or it could be sent to all stations in the Omni-legacy portion 402 of the preamble before the pre-coded portion of the preamble of the SDMA transmission.

Figure 5A:
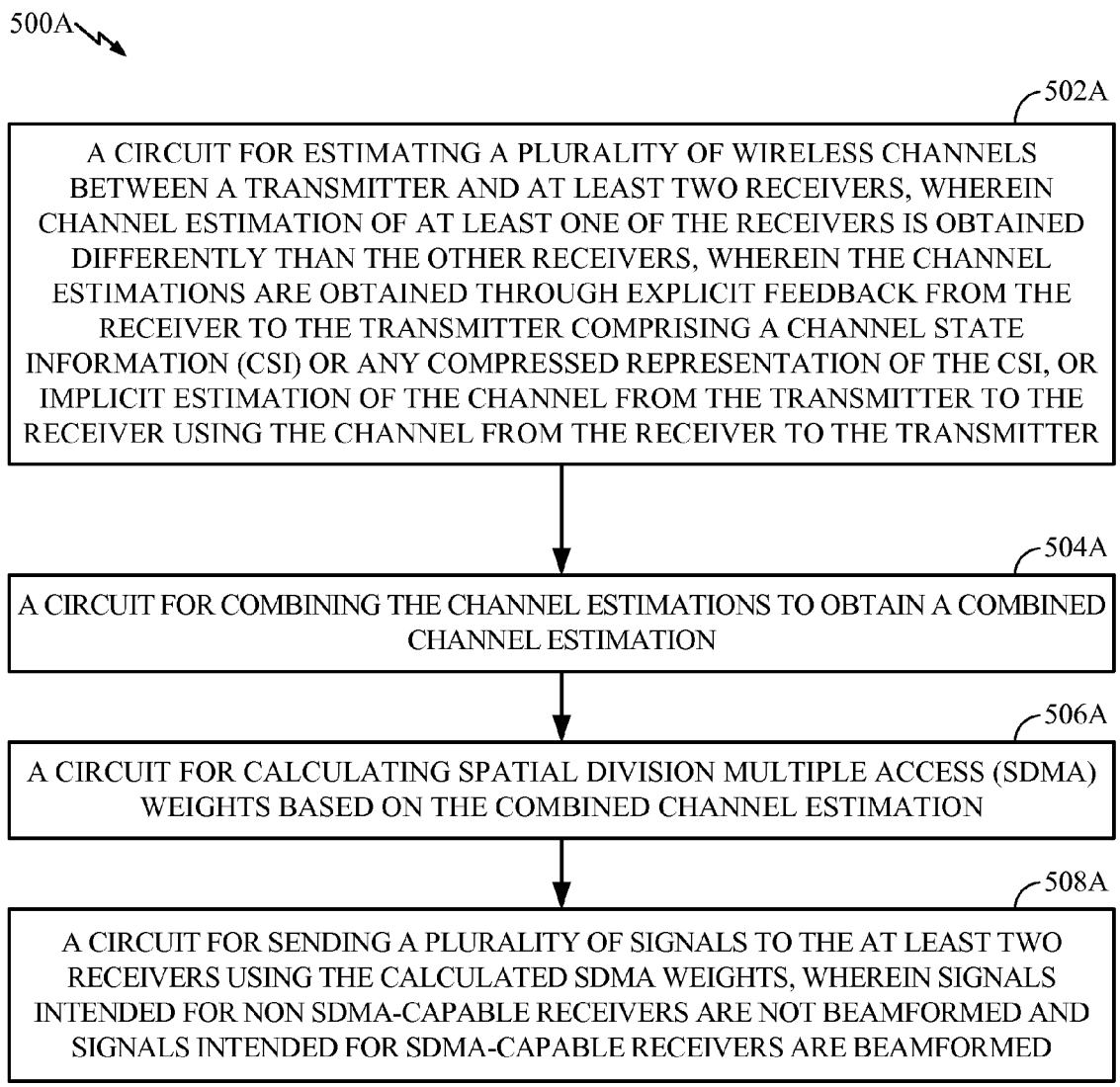
FIG. 5A illustrates example components capable of performing the operations shown in FIG. 5.
Figure 6A:
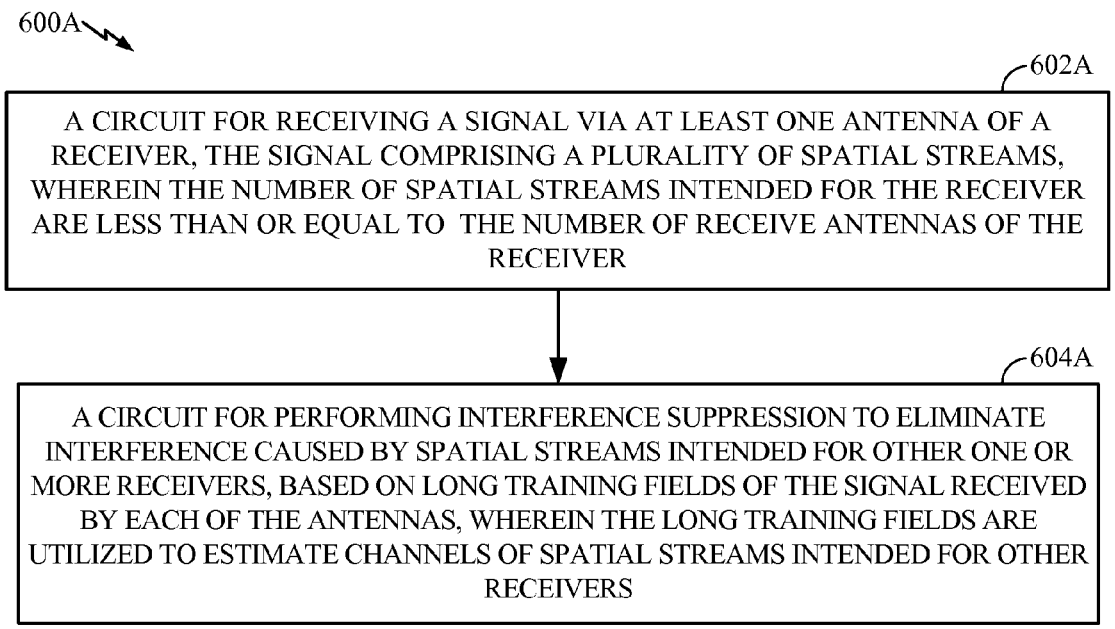
FIG. 6A illustrates example components capable of performing the operations shown in FIG. 6.
Figure 7A:
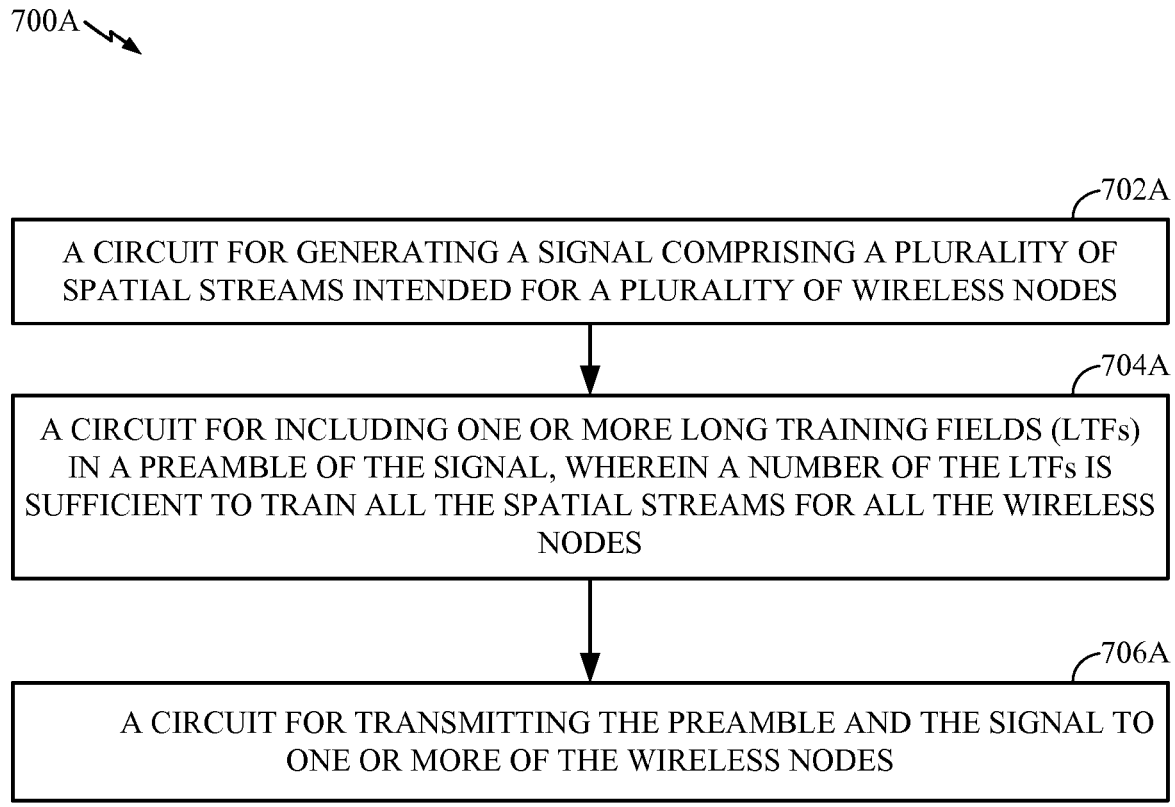
FIG. 7A illustrates example components capable of performing the operations shown in FIG. 7.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 500, 600, and 700 illustrated in FIGS. 5, 6 and 7 correspond to components 500A, 600A and 700A illustrated in FIGS. 5A, 6A and 7A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of transmission medium.

Further, it should be appreciated that modules and/or other appropriate means for performing the methods and techniques described herein can be downloaded and/or otherwise obtained by a user terminal and/or AP as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point station, an access terminal, a mobile handset, or other type of wireless device with processing logic and elements to perform the techniques provided herein.

While the foregoing is directed to aspects of the present disclosure, other and further aspects of the disclosure may be devised without departing from the basic scope thereof, and the scope thereof is determined by the claims that follow.

What is claimed is:

1. A method for wireless communications, comprising:
 receiving a signal via at least one antenna of a receiver, the signal comprising a plurality of spatial streams, wherein a number of spatial streams from the plurality of spatial streams intended for the receiver is less than or equal to a number of the antennas; and
 performing, based on one or more long training fields (LTFs) of the signal received by each of the antennas, interference suppression to eliminate interference caused by one or more of the spatial streams intended for other receivers, wherein the LTFs are utilized to estimate channels of the spatial streams intended for the other receivers.

2. The method of claim 1, wherein the signal comprises information about at least one of a maximum number of the spatial streams, or information about spatial streams intended for each of the receivers.

3. The method of claim 1, further comprising:
 receiving information about at least one of a maximum number of the spatial streams, or information about spatial streams intended for each of the receivers in a packet before reception of the signal.

4. The method of claim 1, further comprising:
 decoding one or more spatial streams intended for the receiver using knowledge about the spatial streams intended for the other receivers gained by performing the interference suppression.

5. The method of claim 1, wherein:
 the signal comprises one or more LTFs, and
 a number of the LTFs is sufficient to train all of the plurality of spatial streams for all the receivers.

6. The method of claim 5, wherein:
 the LTFs are followed by a very high throughput signal field (VHT-SIG) of the signal, and
 the VHT-SIG field comprises information about at least one of a modulation type, a coding rate or a length of transmission packet associated with each of the receivers.

7. The method of claim 5, wherein:
 a set of the LTFs are preceded by a very high throughput signal field (VHT-SIG) of the signal, and
 the VHT-SIG field comprises information about a number of LTFs from the set and about which of the plurality of spatial streams is assigned to which of the receivers.

8. The method of claim 1, wherein the signal is transmitted using spatial division multiple access (SDMA).

9. An apparatus for wireless communications, comprising:
 a receiver configured to receive a signal via at least one antenna of the apparatus, the signal comprising a plurality of spatial streams, wherein a number of spatial streams from the plurality of spatial streams intended for the apparatus is less than or equal to a number of the antennas; and
 a circuit configured to perform, based on one or more long training fields (LTFs) of the signal received by each of the antennas, interference suppression to eliminate interference caused by one or more of the spatial streams intended for other apparatuses, wherein the LTFs are utilized to estimate channels of the spatial streams intended for the other apparatuses.

10. The apparatus of claim 9, wherein the signal comprises information about at least one of a maximum number of the spatial streams, or information about spatial streams intended for each of the other apparatuses.

11. The apparatus of claim 9, wherein the receiver is also configured to:
 receive information about at least one of a maximum number of the spatial streams, or information about spatial streams intended for each of the other apparatuses in a packet before reception of the signal.

12. The apparatus of claim 9, further comprising:
 a decoder configured to decode one or more spatial streams intended for the apparatus using knowledge about the spatial streams intended for the other apparatuses gained by performing the interference suppression.

13. The apparatus of claim 9, wherein:
 the signal comprises one or more LTFs, and
 a number of the LTFs is sufficient to train all of the plurality of spatial streams for all the other apparatuses.

14. The apparatus of claim 13, wherein:
the LTFs are followed by a very high throughput signal field (VHT-SIG) of the signal, and
the VHT-SIG field comprises information about at least one of a modulation type, a coding rate or a length of transmission packet associated with each of the other apparatuses.

15. The apparatus of claim 13, wherein:
a set of the LTFs are preceded by a very high throughput signal field (VHT-SIG) of the signal, and
the VHT-SIG field comprises information about a number of LTFs from the set and about which of the plurality of spatial streams is assigned to which of the other apparatuses.

16. The apparatus of claim 9, wherein the signal is transmitted using spatial division multiple access (SDMA).

17. An apparatus for wireless communications, comprising:
means for receiving a signal via at least one antenna of the apparatus, the signal comprising a plurality of spatial streams, wherein a number of spatial streams from the plurality of spatial streams intended for the apparatus is less than or equal to a number of the antennas; and
means for performing, based on one or more long training fields (LTFs) of the signal received by each of the antennas, interference suppression to eliminate interference caused by one or more of the spatial streams intended for other apparatuses, wherein the LTFs are utilized to estimate channels of the spatial streams intended for the other apparatuses.

18. The apparatus of claim 17, wherein the signal comprises information about at least one of a maximum number of the spatial streams, or information about spatial streams intended for each of the other apparatuses.

19. The apparatus of claim 17, wherein the means for receiving is further configured to:
receive information about at least one of a maximum number of the spatial streams, or information about spatial streams intended for each of the other apparatuses in a packet before reception of the signal.

20. The apparatus of claim 17, further comprising:
means for decoding one or more spatial streams intended for the apparatus using knowledge about the spatial streams intended for the other apparatuses gained by performing the interference suppression.

21. The apparatus of claim 17, wherein:
the signal comprises one or more LTFs, and
a number of the LTFs is sufficient to train all of the plurality of spatial streams for all the other apparatuses.

22. The apparatus of claim 21, wherein:
the LTFs are followed by a very high throughput signal field (VHT-SIG) of the signal, and
the VHT-SIG field comprises information about at least one of a modulation type, a coding rate or a length of transmission packet associated with each of the other apparatuses.

23. The apparatus of claim 21, wherein:
a set of the LTFs are preceded by a very high throughput signal field (VHT-SIG) of the signal, and
the VHT-SIG field comprises information about a number of LTFs from the set and about which of the plurality of spatial streams is assigned to which of the other apparatuses.

24. The apparatus of claim 17, wherein the signal is transmitted using spatial division multiple access (SDMA).

25. A computer-program product for wireless communications, comprising a computer-readable medium comprising instructions executable to:
receive a signal via at least one antenna of a receiver, the signal comprising a plurality of spatial streams, wherein a number of spatial streams from the plurality of spatial streams intended for the receiver is less than or equal to a number of the antennas; and
perform, based on one or more long training fields (LTFs) of the signal received by each of the antennas, interference suppression to eliminate interference caused by one or more of the spatial streams intended for other receivers, wherein the LTFs are utilized to estimate channels of the spatial streams intended for the other receivers.

26. A wireless node, comprising:
at least one antenna;
a receiver configured to receive a signal via the at least one antenna of the wireless node, the signal comprising a plurality of spatial streams, wherein a number of spatial streams from the plurality of spatial streams intended for the wireless node is less than or equal to a number of the antennas; and
a circuit configured to perform, based on one or more long training fields (LTFs) of the signal received by each of the antennas, interference suppression to eliminate interference caused by one or more of the spatial streams intended for other wireless nodes, wherein the LTFs are utilized to estimate channels of the spatial streams intended for the other wireless nodes.

* * * * *